Oct. 14, 1941.    R. I. MARKEY    2,259,076
COWL FASTENER
Filed July 25, 1940
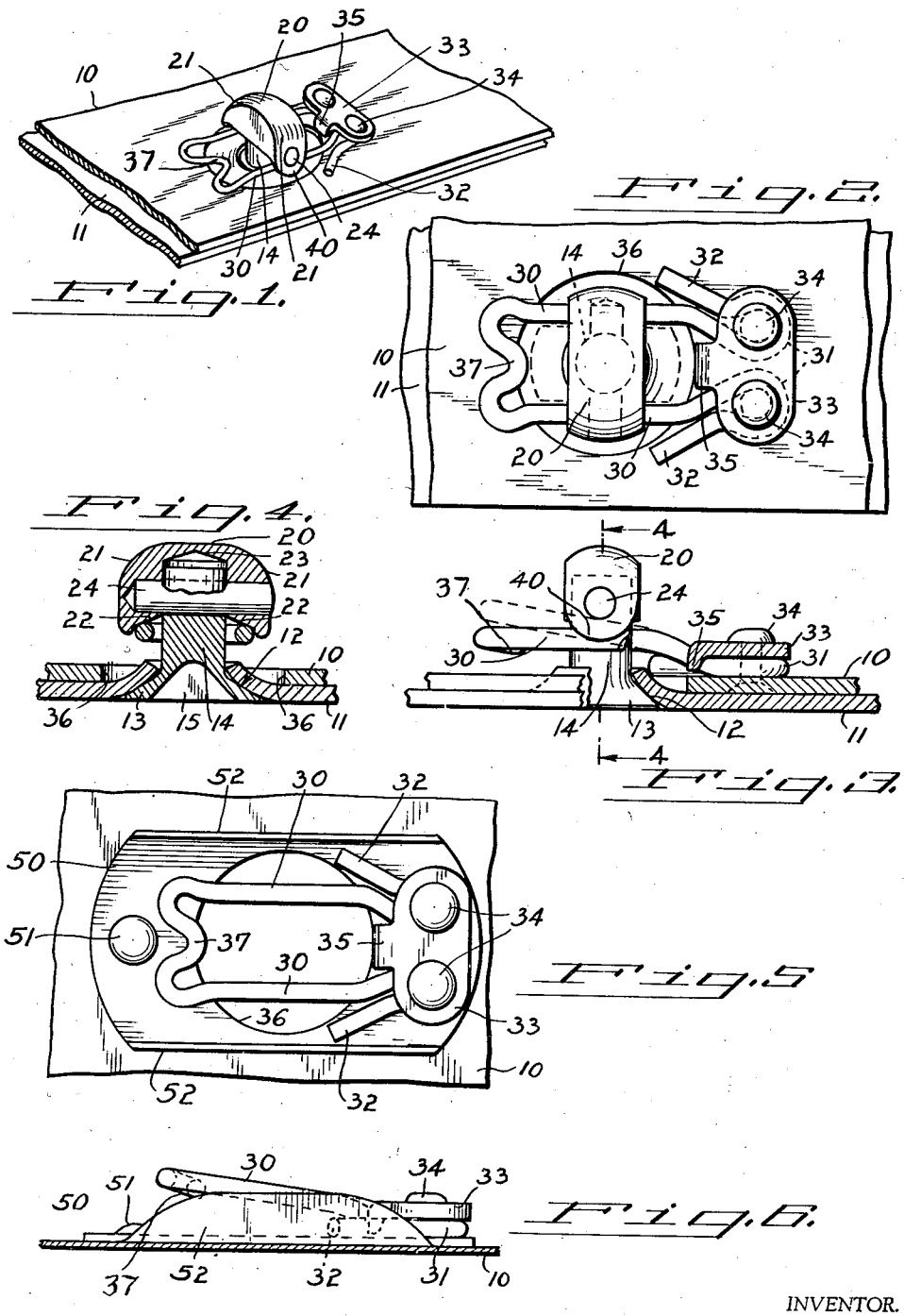
INVENTOR.
Roscoe I. Markey
BY
Geo. A. Senior
ATTORNEY.

Patented Oct. 14, 1941

2,259,076

UNITED STATES PATENT OFFICE 2,259,076

COWL FASTENER

Roscoe I. Markey, East Orange, N. J., assignor to Pollak Manufacturing Company, Arlington, N. J., a corporation of New Jersey Application July 25, 1940, Serial No. 347,376

10 Claims. (Cl. 24—221)

The invention relates to cowl fasteners.

While cowl fasteners such as those illustrated and described in connection with the present invention may be used in various places, the largest field at the present time is in the aircraft industry.

As is well known an airplane has a number of removable cowl pieces, the number and shape depending upon the size of the plane. It is essential that a means be provided whereby the removable cowling may be easily and quickly detached and just as easily and quickly again secured and locked in position. The foregoing is the principal object of the invention.

As the fastening means are sometimes located in rather inaccessible positions a further object is to provide an exceedingly simple and efficient means for operating the cowl fasteners. When the removable cowling is detached it may be thrown on the ground or floor and someone may inadvertently step on it or throw something on it. It is a further object of the invention to make the cowl fastener rugged and with no delicate parts that might be injured by careless handling. An additional object is to provide a cowl fastener having a maximum amount of flexibility, thus making it much more adaptable for a series of cowl fasteners located on a surface of a curved contour or for fastening the free edges of a hinged cowl, door or other covering.

Numerous other objects and advantages than those heretofore enumerated will become apparent as this specification proceeds. Referring to the drawing forming a part thereof and in which preferred embodiments of the invention are illustrated:

Fig. 1 is a perspective view of one of the cowl fasteners;

Fig. 2 is a top plan view;

Fig. 3 is a side elevation, parts being in section and parts broken out;

Fig. 4 is a cross sectional view taken on line 4—4 of Fig. 3;

Figs. 5 and 6 are a plan view and end view, respectively, showing the cowl fastener applied with a reinforcing plate to an extremely thin piece of cowling.

This application is a continuation in part of my copending application Serial No. 250,528, filed January 12, 1939, and allowed May 24, 1940.

In the drawing, for simplicity of illustration, a single cowl fastener is shown. It is understood the cowl fasteners are ordinarily aligned along the edge of the cowling support and movable cowling, although sometimes, as in the case of a hinged door for a small compartment, only a single cowl fastener may be employed. While in the specification and claims the expression cowling or cowl parts is generally used, it is to be understood this includes any and all sheet metal constructions or a construction in which one part might be a rigid substantial member.

Referring again to the drawing, the reference numeral 10 designates the cowling support and 11 the removable cowling. While, as heretofore stated, it is customary to use a series of cowl fasteners the parts of the cowl fastener will be referred to in the singular hereinafter.

The removable cowling 11 has a conical depressed region 12 which acts as a seat for the truncated head 13 of the stud or post 14, the stud proper passing through a central opening in the seat 12. It will be noted the stud 14 has ample clearance in its opening and is thus free to move somewhat in all directions. Thus the lining up of the stud in relation to the fastening means on the cowl support, hereinafter described, will be greatly facilitated. This is particularly useful where the removable cowling has a curved or irregular contour or where it is hinged and swingable.

The truncated head 13 has a slot or kerf 15 for the reception of a screw driver to rotate the stud. The slot 15 terminates adjacent the periphery of the head 13. As heretofore stated, the cowl fastener must of necessity be occasionally located in inaccessible places. The formation of the slot 15 is of great assistance under these conditions. The slot forms a seat for the screw driver and prevents it from slipping out of the normally open ends.

The stud 14 is provided with a cross member 20 which projects on either side thereof. The cross member 20 is in the form of a block and has its upper corners rounded as indicated at 21—21 and its lower region is undercut as shown at 22—22. Numerous methods may be utilized to hold the cross member 20 on the stud 14. As illustrated in Fig. 4 the cross member is bored or formed with an opening 23 into which the end of the stud 14 snugly fits. A cross pin 24 passes through alined openings in the stud and cross member, the opening in one side of the cross member terminating short of the end thereof. The pin 24 is driven into the alined openings and firmly holds the cross member or cap in position on the stud.

Naturally the cross member 20 is secured in place after the stud has been passed through the opening in the seat 12 of the removable cowling.

It will thus be apparent that the stud is attached to and cannot become separated from the movable cowling. Yet at the same time there is no rigid connection between the stud and the member to which it is attached. This great flexibility of the connection between the stud and the movable cowling makes for the advantages heretofore described and in addition dispenses with an absolutely accurate positioning of the stud in relation to its co-operating fastening member, hereinafter described, on the cowl support.

The co-operating fastening member on the cowling support 10 comprises an elastic or resilient element of cantilever construction attached to the cowling support and adapted to be readily engaged with or disengaged from the member, heretofore described, on the movable cowling.

The resilient member is made of high carbon spring steel and as illustrated is generally U-shaped in plan view, the ends of the legs or straightaway portion 30 being formed with eyes 31. It will be noted the straightaway portions or legs 30 are spaced apart substantially or a little more than the width of the cross member or cap 20. The eyes 31 have their free ends at 32 extending and in contact with the cowling thus adding to the rigidity of the resilient member. A retaining plate 33 is positioned over the eyes and rivets 34 pass through suitable openings in the plate and the eyes and secure the resilient member to the cowling support. The retaining plate 33 has a toe 35 which extends downwardly between the legs of the U-shaped resilient member adjacent the eyes 31. The retaining plate and its toe give additional strength and rigidity to the structure and the toe serves another function which will be described hereinafter.

The cowling support is provided with an opening 36 through which the stud 14 and cap 20 may be entered. The cowl fastener is shown in its locked position in Figs. 1 to 4. Prior to locking when the stud and cap are being entered through the opening 36 the cap is at about 90° from the full line position of Fig. 2 or in the position indicated in broken lines in this figure, so that it rests between the legs or straightaway portions of the resilient member.

The ends of the legs or straightaway portions 20 are secured to the cowling at one side of the opening 36 and the connected portion of the legs is remote from the opposite side of said opening. The connected portion of the legs has an inward bend as indicated at 37. The distance between this bend and the toe 35 is substantially that or a little more than the length of the cross member or cap 20. This arrangement in addition to the spacing of the straightaway portions of the legs in relation to the width of the cap and the rounded contour of the cap provides for what might be termed an automatic positioning of the cap and stud in relation to the resilient member.

The deformed portion 37 of the resilient member and the toe or extension 35 from the retaining plate 33 serve another important function in that they prevent the cap 20 from hanging or catching on the stationary part 10 during the releasing of the fastener. It is often necessary to release the cowling with great celerity and if one or more of the fasteners on a piece of cowling should be hung up or caught it is not only annoying but wastes time. As indicated in Figs. 3 and 6 the deformed portion 37 may be given a slight downward bend. This in addition to the nicely rounded contour of the toe 35 assists in insuring the easy and quick release of the parts.

As heretofore stated the cap 20 may be secured to the stud 14 in numerous ways. In actual practice the hole in the stud 14 is slightly larger in diameter than the hole in the cap 20. This provides a space for the swelling of the pin 24 when it is driven in to lock the cap in place. As the pin enlarges more in the stud than in the cap it is impossible for the pin to accidently fall out. The difference in dimensions between the diameters of the holes in the stud and in the cap is so slight it is practically impossible to illustrate same in the drawing. However in Fig. 4 the heavy line on the under side of the pin where it extends through the stud is indicative of the slightly larger diameter of the hole in the stud.

The ends of the cross member or cap are rounded as indicated at 40 in Figs. 1 and 3. When the fastener is being turned from one position to another these rounded ends ride over the legs of the resilient member and insure against any cutting action that might exist due to sharp corners on the cap when it is being turned.

In Fig. 3, the resilient member and the stud and its cap are shown in full lines in the locked position and the resilient member is indicated in broken lines in its free position. Obviously the stud and its cap may be turned in either direction to bring the fastener from its locked position to the unlocked position or vice versa. The undercut regions 22 on the cap engaging the legs of the resilient member insure against any possibility of the fastener becoming loosened due to vibration or shifting of the cowling parts.

In some instances the cowling support might be of very thin material and there would be a tendency for the fastening rivets to pull out. As shown in Figs. 5 and 6 a reinforcement plate 50 is interposed between the resilient member and the cowling. The reinforcement plate is secured to the cowling by the rivets 34 and an additional rivet 51. Flanges 52 are provided on the sides of the reinforcement plate to strengthen it.

Changes in details of construction and arrangements of parts such as would occur to one skilled in the art are to be considered as coming within the spirit of the invention as set forth in the appended claims.

I claim:

1. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, said resilient member having two straightaway portions connected at one end, said straightaway portions being spaced apart substantially the width of the cross member and their ends being secured to. said second mentioned cowl part on one side of said opening, the connected portion of said straightaway portions being remote from the opposite side of said opening, the free portion of said resilient member being out of the plane of said second mentioned cowl part, and said cross member on said stud being adapted to pass through and to co-operate with said resilient member to detachably secure said cowl parts together.

2. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening and the closed portion of said U-shaped member extending beyond the opposite side of said opening, the free portion of said resilient member being out of the plane of said second mentioned cowl part, and said cross member on said stud being adapted to pass through and to co-operate with said resilient member to detachably secure said cowl parts together.

3. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, said resilient member having two straightaway portions connected at one end, said straightaway portions being spaced apart substantially the width of the cross member and their ends being secured to said second mentioned cowl part on one side of said opening, the connected portion of said straightaway portions being remote from the opposite side of said opening, the free portion of said resilient member being out of the plane of said second mentioned cowl part, said cross member on said stud being adapted to pass between said straightaway portions, and means on said cross member to co-operate with and engage said straightaway portions of said resilient member so as to detachably secure said cowl parts together.

4. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening and the closed portion of said U-shaped member extending beyond the opposite side of said opening, the free portion of said resilient member being out of the plane of said second mentioned cowl part, said cross member on said stud being adapted to pass between the legs of said resilient member, and means on said cross member to co-operate with and engage said resilient member so as to detachably secure said cowl parts together.

5. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, said resilient member having two straightaway portions connected at one end, said straightaway portions being spaced apart substantially the width of the cross member and their ends being secured to said second mentioned cowl part on one side of said opening, the connected portion of said straightaway portions being remote from the opposite side of said opening, the free portion of said resilient member being out of the plane of said second mentioned cowl part, said cross member on said stud being adapted to pass between said straightaway portions, and having undercut regions on said cross member adjacent said stud, said undercut regions co-operating with and engaging said straightaway portions of said resilient member so as to detachably secure said cowl parts together.

6. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening, a retaining plate for securing said legs, the closed portion of said U-shaped member extending beyond the opposite side of said opening, an inward bend in the closed portion of said U-shaped member, the distance between said bend and said retaining plate being substantially the length of the cross member, the free portion of said resilient member being out of the plane of said second mentioned cowl part, and said cross member on said stud being adapted to pass through and to co-operate with said resilient member to detachably secure said cowl parts together.

7. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening, extensions from said legs in the region where they are secured to the cowl part, said extensions bearing on the cowl part, the closed portion of said U-shaped member extending beyond the opposite side of said opening, the free portion of said resilient member being out of the plane of said second mentioned cowl part, and said cross member on said stud being adapted to pass through and to co-operate with said resilient member to detachably secure said cowl parts together.

8. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, a resilient member formed of wire, and substantially U-shaped in plan view, said resilient member extending across said opening, the ends of its legs being secured to said second mentioned cowl part at one side of said opening and the closed portion of said U-shaped member extending beyond the opposite side of said opening, the free portion of said resilient member being out of the plane of said second mentioned cowl part, and said cross member on said stud being adapted to pass through and to co-operate with said resilient member to detachably secure said cowl parts together, and a reinforcement member interposed between said resilient member and its cowl part.

9. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening, a retaining plate for securing said legs, said retaining plate having a toe thereon extending downwardly between the legs in the region where said legs are secured to the cowl part, the closed portion of said U-shaped member extending beyond the opposite side of said opening, the free portion of said resilient member being out of the plane of said second mentioned cowl part, and said cross member on said stud being adapted to pass through and to co-operate with said resilient member to detachably secure said cowl parts together.

10. A device of the character described having in combination, a pair of cowl parts to be connected together, a headed stud carried by one of said cowl parts, said stud and its head being freely mounted in said cowl part, a cross member secured to the end of said stud opposite said head, the other of said cowl parts being provided with an opening, said opening being of sufficient size to permit said cross member passing therethrough, and a resilient member formed of wire, and substantially U-shaped in plan view, said resilient member extending across said opening, the ends of its legs being secured to said second mentioned cowl part at one side of said opening, a retaining plate for securing said legs, said retaining plate having a toe extending downwardly between the legs in the region where said legs are secured to said cowl part, the closed portion of said U-shaped member extending beyond the opposite side of said opening, an inward bend in the closed portion of said U-shaped member, the distance between said bend and the toe on said retaining plate being substantially the length of the cross member, the free portion of said resilient member being out of the plane of said second mentioned cowl part, and said cross member on said stud being adapted to pass through and to cooperate with said resilient member to detachably secure said cowl parts together.

ROSCOE I. MARKEY.